United States Patent [19]
Chen

[11] Patent Number: 5,513,873
[45] Date of Patent: May 7, 1996

[54] ADJUSTABLE HANDLE ASSEMBLY FOR PUSH CART

[76] Inventor: Shou-Mao Chen, 58, Ma Yuan West St., Taichung, Taiwan

[21] Appl. No.: 343,231

[22] Filed: Oct. 18, 1994

[51] Int. Cl.⁶ ........................................ B62B 1/12
[52] U.S. Cl. ..................... 280/655; 280/47.315; 280/37; 16/115
[58] Field of Search ................. 280/655, 655.1, 280/47.315, 47.371, 47.36, 37; 16/115; 190/18 A

[56] References Cited

U.S. PATENT DOCUMENTS

| | | | |
|---|---|---|---|
| 3,306,639 | 2/1967 | Lyon | 16/115 |
| 3,773,375 | 11/1973 | Nehls | 16/115 |
| 5,374,073 | 12/1994 | Hung-Hsin | 280/655 |

*Primary Examiner*—Margaret A. Focarino
*Assistant Examiner*—Carla Mattix

[57] ABSTRACT

A handle of a push cart includes two rods slidably engaged in two tubes and each having a number of teeth. Two sleeves are secured on top of the tubes and each has a pair of lugs. Two pins are secured between the lugs. A resilient arm has two ends slidably engaged with the pins, the ends each includes a tooth for engaging with the teeth of the rods so as to secure the rods to the tubes. The teeth of the resilient arm are disengaged from the teeth of the rods when the resilient arm is depressed. A fence is secured to the sleeves for preventing the resilient arm from being depressed inadvertently.

6 Claims, 7 Drawing Sheets

ADJUSTABLE HANDLE ASSEMBLY FOR PUSH CART

BACKGROUND OF THE INVENTION

1. Field of the Invention

The present invention relates to a handle, and more particularly to an adjustable handle assembly for push carts.

2. Description of the Prior Art

Typical push carts comprise a car body for carrying objects, such as luggage, suitcase etc., and a handle assembly which can be adjusted to different lengths for carrying various sizes of objects. However, normally, the handle assemblies comprise a rather complicated configuration that is adverse for operation purposes and for manufacturing purposes.

The present invention has arisen to mitigate and/or obviate the afore-described disadvantages of the conventional handle assemblies for push cars.

SUMMARY OF THE INVENTION

The primary objective of the present invention is to provide an adjustable handle assembly which includes a greatly simplified configuration that can be easily operated.

In accordance with one aspect of the invention, there is provided a handle assembly for a push cart comprising two tubes each including an upper end having a hole formed therein, two rods slidably engaged in the tubes and each including a plurality of first teeth formed thereon, a plate means including two end portions having sleeves formed thereon for securing to the upper ends of the tubes, the sleeves each including an orifice formed therein and aligned with the holes of the tubes, the sleeves each including a supporting means provided thereon, and a resilient arm including two ends slidably engaged in the supporting means and engaged with the orifices of the sleeves and the holes of the tubes, the ends each including at least one second tooth formed thereon for engaging with the first teeth so as to secure the rods to the tubes.

The rods each includes a channel formed therein, a bar secured in the channel, the first teeth are formed on the bar, the bars each includes an enlarged first end for engaging with the rods and a second end having a hook means formed thereon for engaging with the rods so as to secure the bars to the rods.

The upper ends of the tubes each includes an aperture formed therein, and a cap having an opening formed therein and aligned with the orifice and the hole, the caps each includes two projections extended outward therefrom for engaging with the apertures of the tubes so as to secure the caps to the tubes.

A fence is secured to the sleeves for protecting the resilient arm from being depressed inadvertently.

The ends of the resilient arm each includes a slot formed therein, the two supporting means each includes a pair of lugs, a pin secured between the lugs and slidably engaged in the slots of the resilient arm so as to guide the ends of the resilient arm to slide relative to the supporting means.

The resilient arm includes an S-shaped portion having a center portion rotatably secured to the plate, the two supporting means each includes a casing for slidably receiving the ends of the resilient arm so as to guide the ends of the resilient arm to slide relative to the supporting means.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
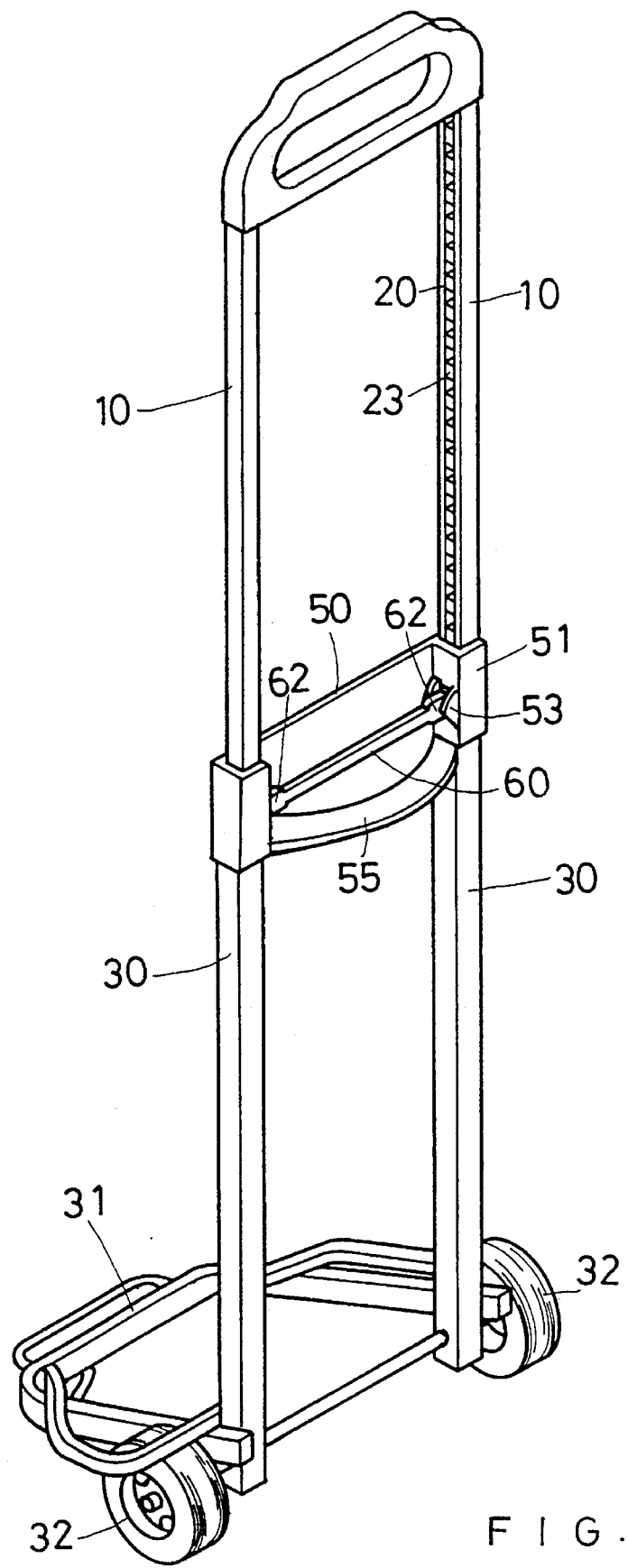
FIG. 1 is a perspective view of a push cart in accordance with the present invention.

Referring to the drawings, and initially to FIG. 1, a typical push cart includes two tubes 30 having a base 31 provided on the bottom portion for carrying objects and having two wheels 32 for moving the push car, and includes two rods 10 slidably engaged in the tubes 30 respectively and adjustable relative to the tubes 30 so as to form the adjustable handle assembly in accordance with the present invention. The adjustable handle assembly comprises an adjusting mechanism for adjusting the relative position between the rods 10 and the tubes 30.

Figure 2:
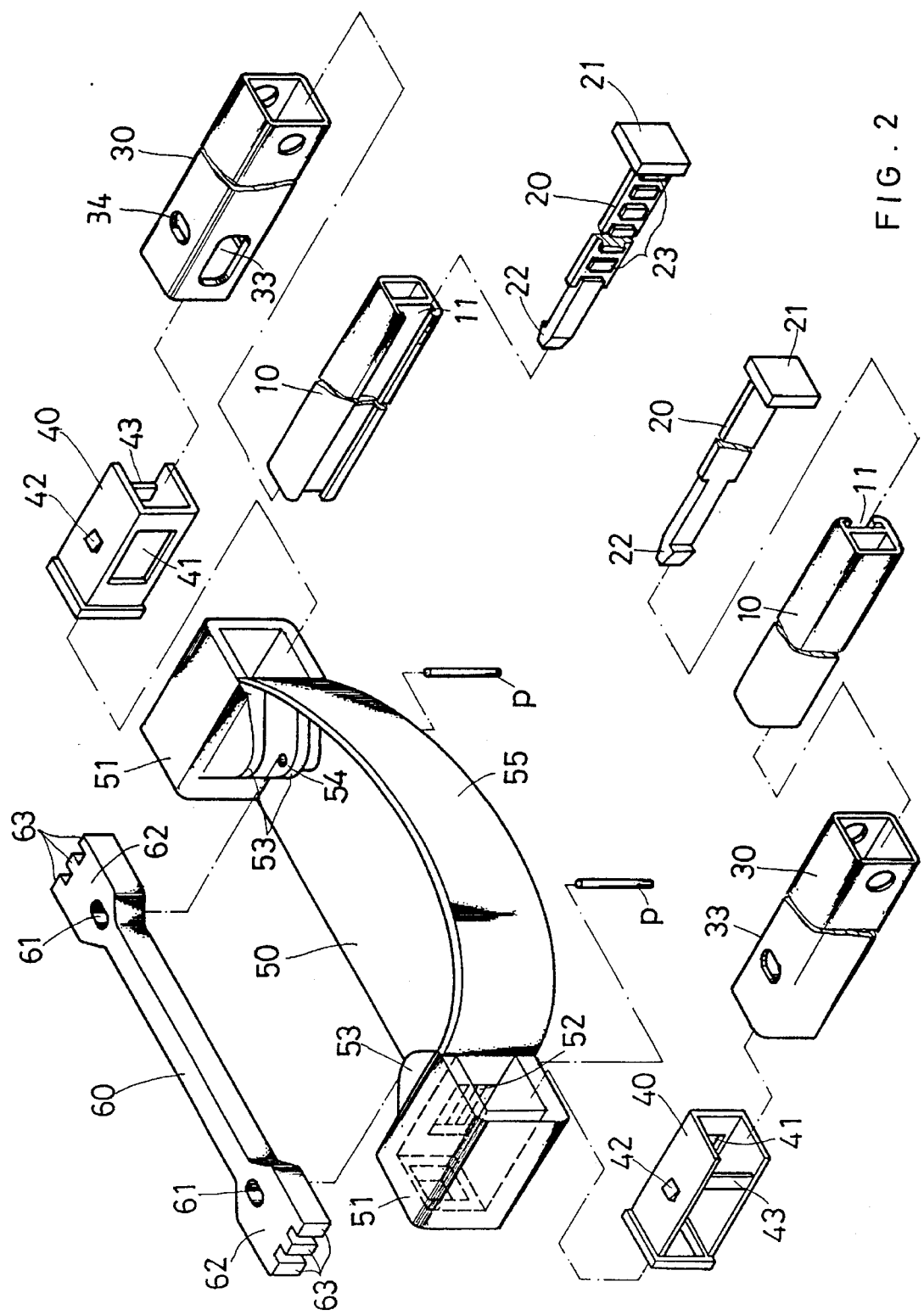
FIG. 2 is an exploded view of the adjusting mechanism.

Referring next to FIGS. 2 and 3, and again to FIG. 1, the rods 10 each includes a channel 11 formed longitudinally therein for engaging with a bar 20 respectively. The bars 20 each includes an enlarged end 21 for engaging with one end of the rods 10 and includes a hook 22 for engaging with the other end of the rods 10 so as to be secured to the rods 10. The bars 20 each includes a plurality of teeth 23 formed therein. The upper ends of the tubes 30 each includes a hole 33 formed therein and two apertures 34 formed therein. Two caps 40 are engaged in the upper ends of the tubes 30 and each includes two projections 42 extended outward therefrom for engaging with the apertures 34 of the tubes 30 so as to be secured to the tubes 30. The caps 40 each includes an opening 41 aligned with the holes 33 of the tubes 30 and each includes a rib 43 formed therein for reinforcing purposes.

A plate 50 includes two sleeves 51 for engaging with the upper ends of the tubes 30 and includes a protecting fence 55 formed in the bottom portion. The sleeves 51 each includes an orifice 52 for aligning with the holes 33 and the openings 41 and each includes a supporting means having two lugs 53 formed thereon. The lugs 53 include holes 54 formed therein for engaging with pins P. A resilient arm 60 includes two enlarged ends 62 formed in the end portions and engaged through the orifices 52, the openings 41 and the holes 33. The enlarged ends 62 each includes a slot 61 formed therein for engaging with the pins P and each includes a number of teeth 63 formed thereon for engaging with the teeth 23 of the bars 20. The slots 61 are arranged such that the enlarged ends 62 may move away from or toward the bars 20 for engaging the teeth 63 with the teeth 23 of the bars 20, best shown in FIGS. 3 and 4. The fence 55 is provided for protecting and preventing the resilient arm 60 from being depressed inadvertently.

Figure 3:
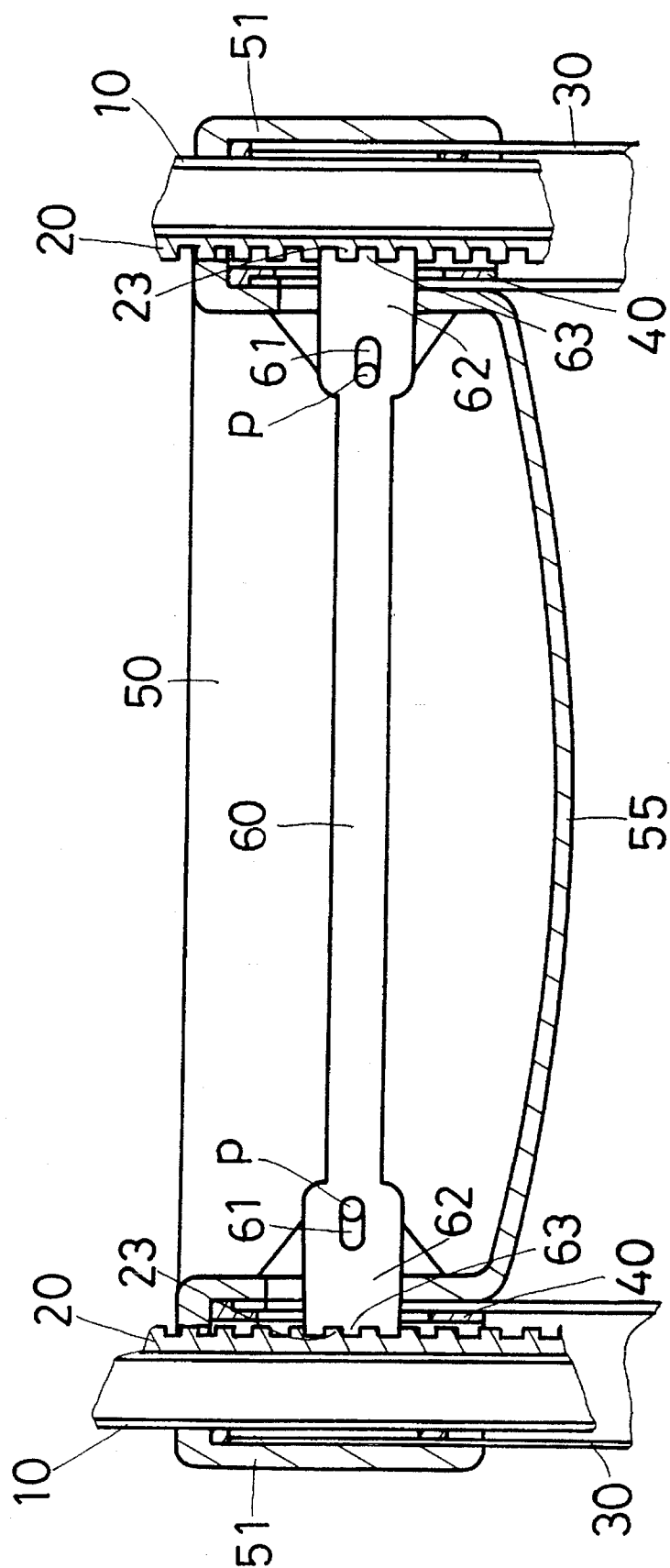
FIGS. 3 and 4 are partial cross sectional views illustrating the operation of the adjusting mechanism.
Figure 4:
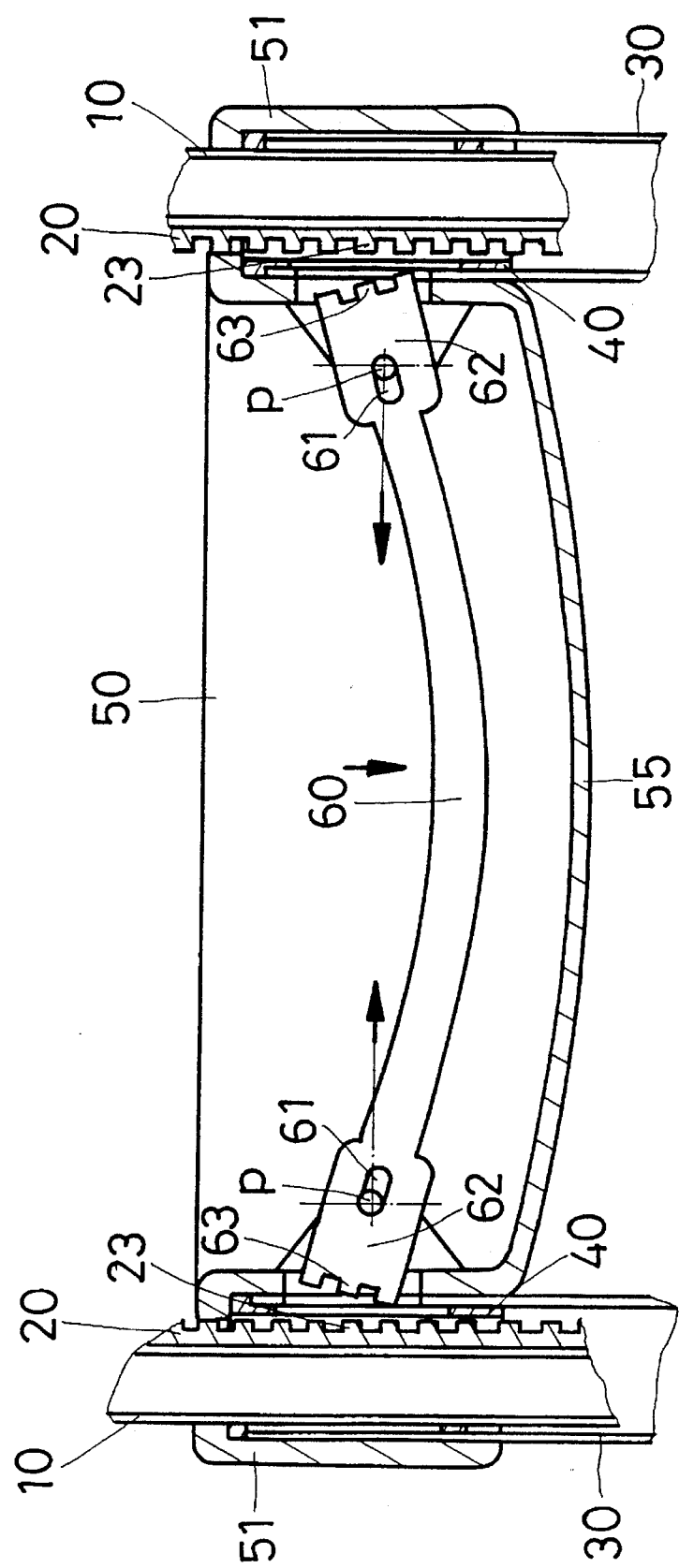

As shown in FIG. 3, when the resilient arm 60 is not depressed, the teeth 63 of the enlarged ends 62 are engaged with the teeth 23 of the bars 20 such that the rods 10 may not move relative to the tubes 30. However, as shown in FIG. 4, when the middle portion of the arm 60 is depressed, the enlarged ends 62 are caused to move away from the bars 20 so as to disengage the teeth 63 from the teeth 23, such that the rods 10 may move freely relative to the tubes 30 so as to adjust the relative position between the rods 10 and the tubes 30. The teeth 63 and 23 may be engaged with each other and the rods 10 and the tubes 30 may be secured in place when the arm 60 is released.

Figure 5:
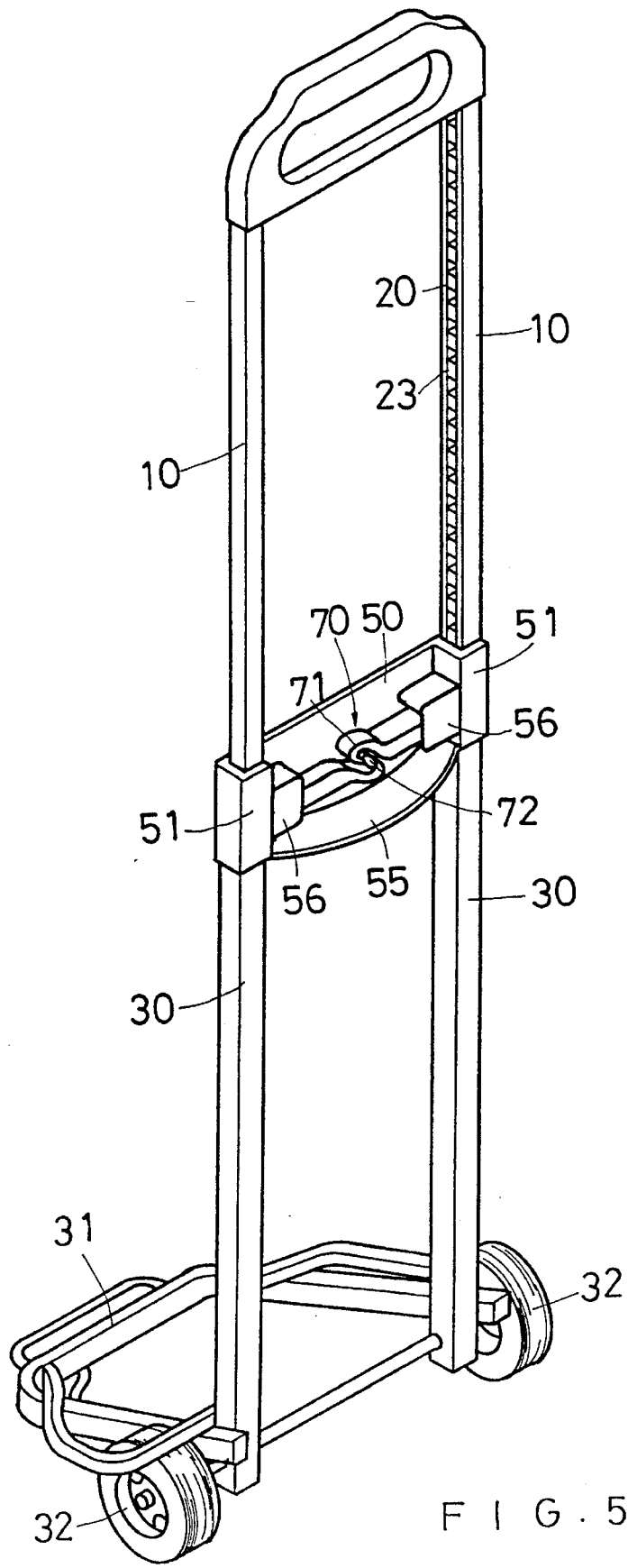
FIG. 5 is a perspective view illustrating another application of the adjusting mechanism.
Figure 6:
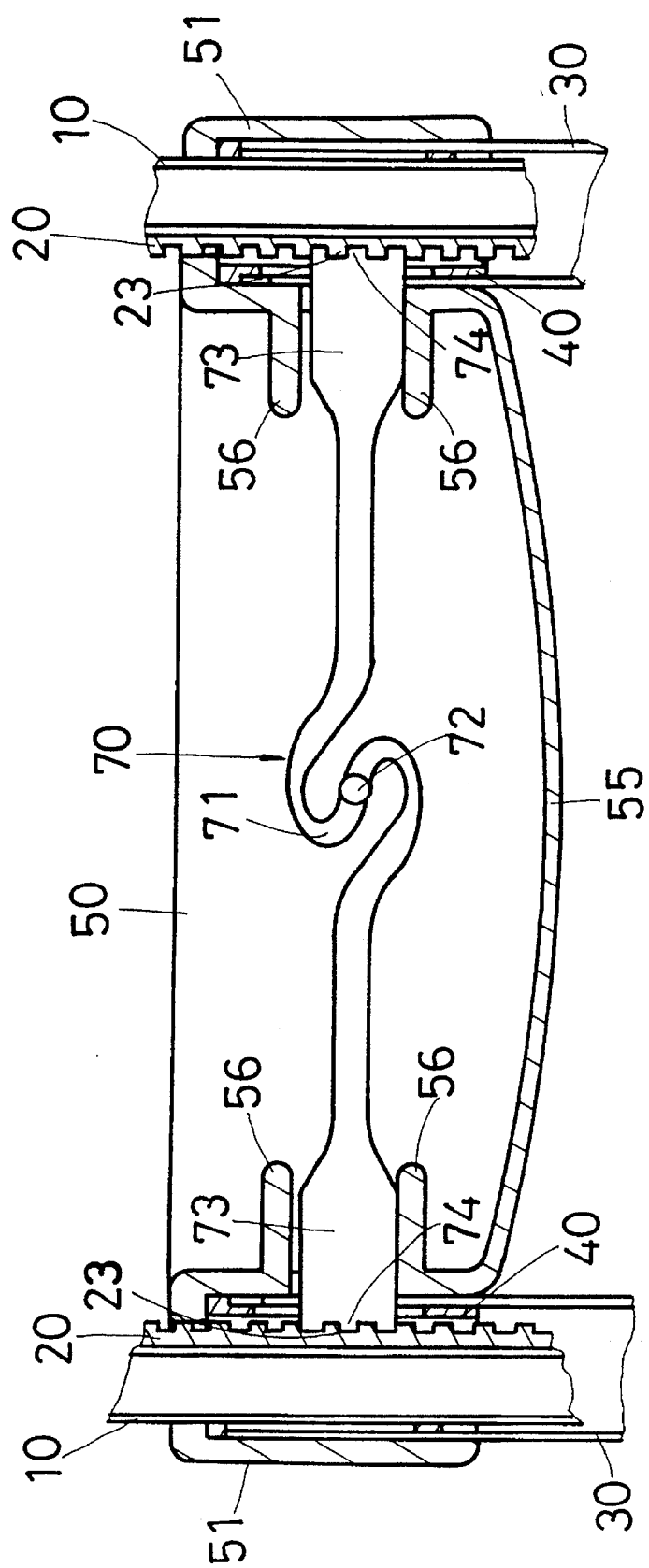
FIGS. 6 and 7 are partial cross sectional views illustrating the operation of the adjusting mechanism as shown in FIG. 5.
Figure 7:
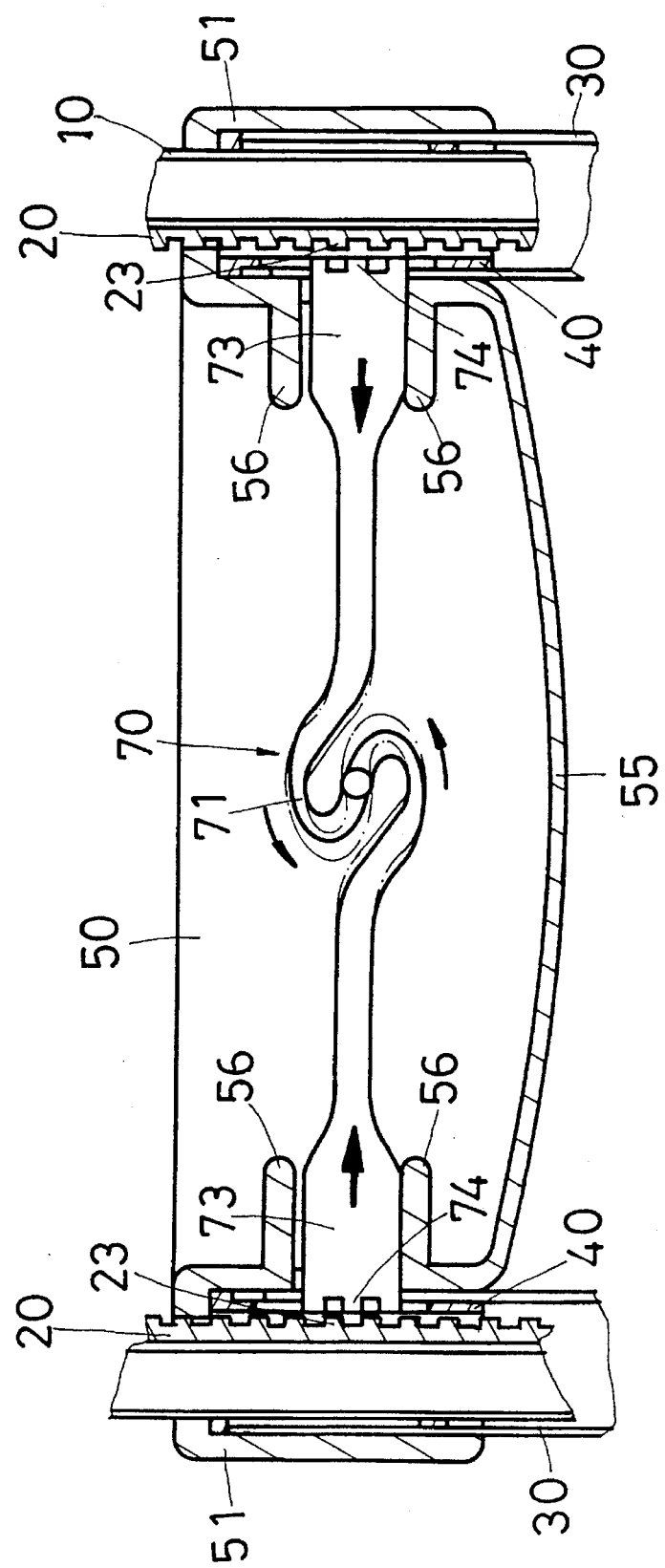

Referring next to FIGS. 5 to 7, alternatively, the supporting means of the sleeves 51 may include a casing 56 for slidably receiving the enlarged ends 73 of a resilient arm 70. The enlarged ends 73 each includes a number of teeth 74 formed thereon for engaging with the teeth 23 of the bars 20. The resilient arm 70 includes an S-shaped middle portion 71 which has a center portion secured to the plate 50 by a fastener 72 such that the middle portion 71 has increased resilience and can be rotated about the fastener 72 by the user in order to disengage the teeth 74 of the enlarged ends 73 from the teeth 23 of the bars 20.

Accordingly, the handle assembly of the push cars in accordance with the present invention includes a greatly simplified configuration that can be easily operated.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A handle assembly for a push cart comprising:

two tubes each including an upper end having a hole formed therein, two rods slidably engaged in said tubes and each including a plurality of first teeth formed thereon, a plate means including two end portions having sleeves formed thereon for securing to said upper ends of said tubes, said sleeves each including an orifice formed therein and aligned with said holes of said tubes, said sleeves each including a supporting means provided thereon, and a resilient arm including two ends slidably engaged in said supporting means and engaged with said orifices of said sleeves and said holes of said tubes, said ends each including at least one second tooth formed thereon for engaging with said first teeth so as to secure said rods to said tubes.

2. A handle assembly according to claim 1, wherein said rods each includes a channel formed therein, a bar secured in said channel, said first teeth are formed on said bar, said bars each includes an enlarged first end for engaging with said rods and a second end having a hook means formed thereon for engaging with said rods so as to secure said bars to said rods.

3. A handle assembly according to claim 1, wherein said upper ends of said tubes each includes an aperture formed therein, and a cap having an opening formed therein and aligned with said orifice and said hole, said caps each includes two projections extended outward therefrom for engaging with said apertures of said tubes so as to secure said caps to said tubes.

4. A handle assembly according to claim 1 further comprising a fence means secured to said sleeves for protecting said resilient arm from being depressed inadvertently.

5. A handle assembly according to claim 1, wherein said ends of said resilient arm each includes a slot formed therein, said two supporting means each includes a pair of lugs, a pin secured between said lugs and slidably engaged in said slots of said resilient arm so as to guide said ends of said resilient arm to slide relative to said supporting means.

6. A handle assembly according to claim 1, wherein said resilient arm includes an S-shaped portion having a center portion rotatably secured to said plate so as to allow rotation of said S-shaped portion, said two supporting means each includes a casing for slidably receiving said ends of said resilient arm so as to guide said ends of said resilient arm to slide relative to said supporting means.

* * * * *